United States Patent Office 3,108,082
Patented Oct. 22, 1963

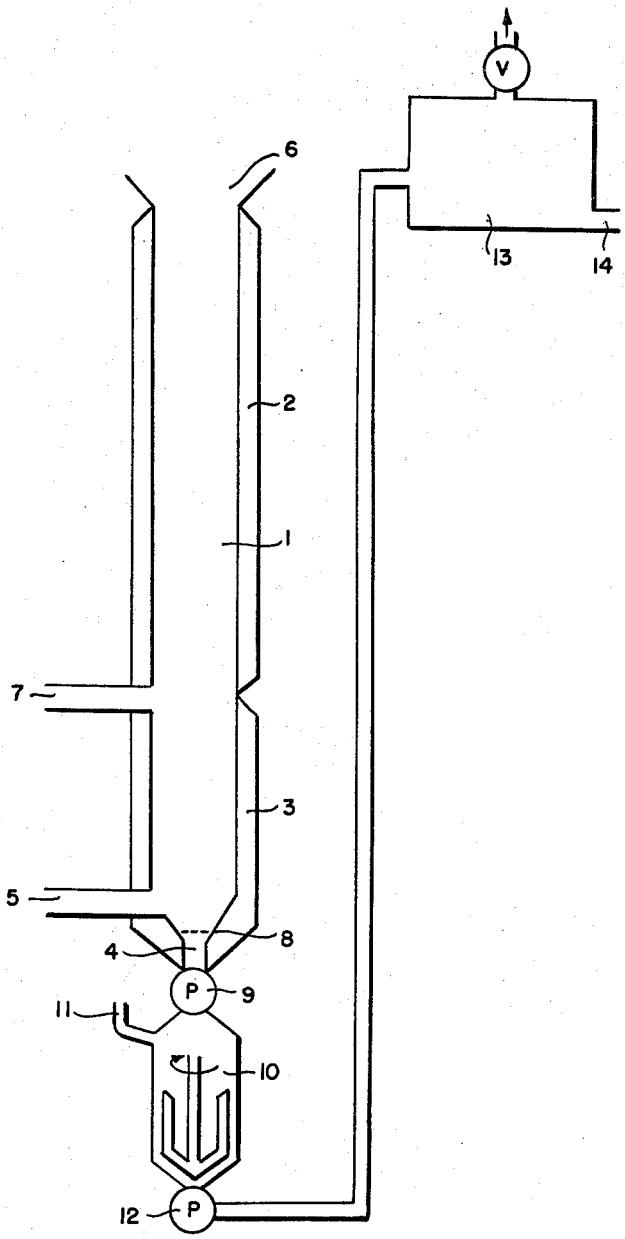

3,108,082
METHOD OF TREATING POLYETHYLENE TEREPHTHALATE SCRAPS
Lothar Riehl, Obernburg (Main), and Erhard Siggel, Laudenbach (Main), Germany, assignors to Vereinigte Glanzstoff-Fabriken AG., Wuppertal-Elberfeld, Germany
Filed Apr. 12, 1960, Ser. No. 21,624
Claims priority, application Germany Apr. 18, 1959
8 Claims. (Cl. 260—2.3)

The present invention relates to an improved process for treating polyethylene terephthalate scraps.

Polyethylene terephthalate is prepared in two stages. Initially, dimethyl terephthalate or terephthalic acid is condensed with ethylene glycol to form the diglycol ester of terephthalic acid by means of an ester interchange. A certain amount of a low molecular weight precondensate is also formed at this time. Thereupon, the temperature of the reaction is raised and a vacuum is applied to the system to produce a polycondensate by splitting off methanol or water. Both the ester interchange reaction and the polycondensation require the use of particular catalysts if the processes are to be completed within a reasonable period of time. The most frequently used catalysts for the ester interchange are magnesium acetate, zinc acetate, manganese acetate, and lead oxide. The catalysts that are commonly employed for the polycondensation stage of the reaction are antimony trioxide, lead oxide, and boron trioxide.

The polymer obtained by the above process is spun from the melt. The resultant fibers are stretched to give a highly oriented material and are then employed in preparing various products.

In commercial operations utilizing polyethylene terephthalate, there is a considerable amount of scrap produced. A number of methods have been devised by which this scrap can be decomposed and reformed into a suitable fiber producing melt. It has been suggested, for example, that the scrap be hydrolyzed with strong mineral acids to recover terephthalic acid. In this process the terephthalic acid is esterified with methanol to form dimethyl terephthalate which in turn is reacted with ethylene glycol and polycondensed in the known manner. In another process the scrap is decomposed with methanol in the presence of suitable catalysts. By this means dimethyl terephthalate is formed immediately, which material is then processed as is described above. Another reaction consists of decomposing the scrap polyethylene terephthalate by alcoholysis with glycols. In this instance low molecular polyesters are formed which can then be polycondensed.

The above described processes can only be carried out satisfactorily if the polyethylene terephthalate scrap contains no foreign substances of an organic nature. It is customary to treat threads with spinning preparations, finishes, or sizes. In such cases the scrap must be purified before it is subjected to a decomposition reaction. Even where a purification step is included, the decomposition products that are obtained must be processed by crystallization and/or distillation if chemically pure products are to be formed.

It is an object of the present invention to provide an improved method of recovering spinnable material from polyethylene terephthalate scrap.

Another object of the invention is to provide a method whereby melt formed from polyethylene terephthalate scrap can be spun without difficulty into fibers having satisfactory properties.

Other objects will become apparent to those skilled in the art from the following detailed description of the invention.

In general, the subject invention comprises the discovery that superheated steam can be used to convert polyethylene terephthalate scrap into a melt which can be directly recondensed and spun into fibers. More particularly, it has been found that if the scrap is exposed to a countercurrent flow of superheated steam in a vessel wherein the temperature of the steam is below the melting point of polyethylene terephthalate in the upper end of the vessel and above the melting point of the scrap in the lower end of the vessel a highly desirable melt is produced. In a preferred embodiment of the invention, aromatic or hydroaromatic ketones or diketones are added to the melt prior to the recondensation and spinning steps.

In the subject process polyethylene terephthalate scrap is passed through a heated tube while the scrap is in contact with a countercurrent flow of superheated steam. The temperature of the steam at its inlet point can vary from about 280° C. to about 450° C. Due to contact with the cold scraps of fiber the temperature of the steam is lowered as it approaches the discharge (upper) end of the tube. In the upper portion of the heated vessel the temperature of the steam varies from about 200° C. to about 270° C. This temperature is sufficient to remove textile auxiliary agents from the fiber pieces which are steam volatile. The auxiliary agents which either are not removed or are only partly removed do not hinder the subject process. These materials are usually esters of phosphoric acid.

In the lower part of the tube the fibers are melted due to the higher steam temperature. Care should be taken to insure that the temperature of the melt does not exceed about 280° C. The melted polymer collects in an area (sump) below the steam inlet. This arrangement prevents the superheated steam from excessively decomposing the polymer. The melt is continuously drawn off from the sump in order to regulate the liquid level.

The drawing diagrammatically illustrates a suitable apparatus for carrying out the subject process.

The apparatus consists of tube 1 which is surrounded by subdivided heating jackets 2 and 3. The temperature in area 2 is preferably maintained at approximately 220° C. to 240° C. In area 3 the temperature is advantageously kept between about 270° C. and 300° C. Tube 1 is tapered at its lower end to form sump 4. Superheated steam is passed into the tube at inlet 5. The temperature of the steam at this point can vary from about 280° C. to about 450° C. The steam flows through tube 1 and exits at opening 6. The temperature of the steam at 6 usually will vary from about 200° C. to about 220° C. Fiber scraps are introduced into the tube through opening 6. The drop in temperature of the steam is caused by and regulated by (1) its contact with the scrap, and (2) the lower temperatures of the walls in the upper part of the tube. A sufficiently high steam temperature is maintained in the upper part of the tube, however, to remove textile auxiliary agents which adhere to the fiber scraps. In order to provide a more positive control of steam temperature it is possible to introduce a second stream of colder steam into the tube at inlet 7. This steam can have a temperature, for example, of from 200° C. to 220° C.

In the lower portion of the tube the fiber material is melted and the melt is collected in sump 4. Because the steam inlet opening 5 is positioned above the sump and above the surface of the melt (the level of the melt is not allowed to go above line 8) substantial decomposition of the polymer is prevented. From sump 4 the melted polymer is drawn off by means of pump 9 to storage container 10 from which it is passed by a second pump 12 into recondenser 13. The melted polymer is only slightly decomposed when it leaves sump 4 but it no longer has a sufficient degree of polymerization to be used immediately for spinning. The polymer in recondenser 13 preferably is heated to a temperature of from about 280° C. to about 287° C. and is held under a vacuum of less than one torr. Inlet 11 serves to introduce an aromatic or hydroaromatic ketone or diketone into the melted polymer. Approximately 0.02% to about 0.06% of the ketone with respect to the melted polymer is supplied to recondenser 13 by means of pump 12. The polycondensate melt is drawn off at the end of condensation trough 14 whereupon it can be immediately spun into fibers. It is clear that the melt can also be drawn off in band form and after cooling and cutting can be further processed in a conventional manner.

Ordinarily, the treatment of fiber scraps with steam superheated to a temperature of from 280° C. to 450° C. would cause the material to decompose into terephthalic acid. The short contact time which prevails in the subject continuous operation, however, substantially prevents the polymer from being decomposed to terephthalic acid. The high temperature steam to which the scraps are exposed at the lower end of the apparatus only decreases the viscosity of the melt to a slight extent. It has been found for example, that polyethylene terephthalate fiber scrap having a relative viscosity of from $\eta_{rel}$ 1.55 to 1.65 is converted by the subject process into a melt having a viscosity of between about $\eta_{rel}$ 1.2 and 1.4 (the viscosity measurements are taken in 1% metacresol solution at 25° C.). From these determinations it is clear that only a slight decomposition of the polymer takes place due to the action of the steam.

As was pointed out above, the melted polymer which is drawn off from sump 4 is recondensed under a vacuum in member 13. It is preferable to add an aromatic or a hydroaromatic ketone or diketone to the melt prior to the recondensation step. If the recondensation is carried out without the addition of the ketone a spinnable polymer is formed. This material, however, has an undesirable gray to gray-blue color. The discoloration of the polymer is due to the presence of metals such as zinc or antimony. These metals arise due to the reduction of the ester interchange or condensation catalysts (usually zinc acetate or antimony trioxide).

The reduction and attendant inactivation of the catalysts causes the recondensation process to proceed at a relatively slow rate. By adding ketones to the melted polymer, however, the reaction speed is considerably increased. The ketones also make it possible to obtain a colorless melt. It is likely that the ketones form soluble and colorless compounds with the metals and by this means cause them to become reactivated. The further reduction of the catalyst compounds still contained in the polymer scraps also seems to be avoided by the use of the ketones.

A number of aromatic and hydroaromatic ketones and diketones can be used in the subject process. These materials include such compounds as 4-methyl-cyclohexanone and benzil, furil and benzoylacetone. Other comparable ketones and diketones can be employed with satisfactory results. The amount of ketone added to the polymer can vary from about 0.02% to about 0.06% by weight with respect to the melted polymer.

Surprisingly, it is not necessary to add glycol to the melt which is drawn off from the sump in order to further condense the polymer. If it is desired, however, glycol can be added to the melt preferably along with the ketones. In addition to glycol, pigments, soluble organic dyestuffs, stabilizers, optical brighteners, and the like may also be incorporated in the melted polymer. It is even possible to add heat sensitive compounds to the melt because of the fact that the recondensation proceeds so rapidly that the compounds are only exposed to high temperatures for a short period of time.

The working up of polyethylene terephthalate scraps is of interest only where these scraps can be reconverted to full value polyesters. One characteristic which determines the quality of a polymer is its softening point. It is desirable that the softening point of polyethylene terephthalate should be at least about 260°. It is known that polyethylene terephthalate contains certain amounts of diglycol ether groups which are difficult to remove and which lower the softening point of the product. In the known processes for treating polyethylene terephthalate scraps, especially those in which the polymers are decomposed through alcoholysis by means of glycol, it is almost impossible to recover products having a sufficiently high softening point. This objectionable feature results because of the fact that the diglycol ether groups are not removed from the polymer.

One of the most important advantages of the subject process is that recondensed polymers are formed having softening points which approximate those of the original polyester. This result is probably due to the fact that because the scraps are only briefly treated with high temperature steam the ester groups of the diglycol ether are largely saponified. The saponified materials are present during the recondensation as end groups which are easily split off.

It is essential that the steam treatment of the polyethylene terephthalate scrap be carried out continuously. If it is expedient, however, the recondensation of the melt can be accomplished in a batch process. A continuous-discontinuous operation of this type is not as satisfactory from an economic standpoint as the total continuous method, but the same product is produced in each instance.

Obviously many modifications and variations of the invention as hereinbefore set forth may be made without departing from the spirit and scope thereof, and therefore only such limitations should be imposed as are indicated in the appended claims.

The invention is hereby claimed as follows:

1. A process for treating polyethylene terephthalate scrap which comprises: continuously passing said scrap in a solid state downwardly through a heated vessel while contacting the scrap with a countercurrent flow of superheated steam, said steam passing from an inlet opening through said vessel and out an exit opening, the temperature of said steam at its exit opening being below the softening point of said scrap and the temperature of said steam at its inlet opening being above the softening point of said scrap, whereby said scrap is melted in the area of said inlet opening, and withdrawing melt from said vessel at a rate such that the level of melt within said vessel remains below the inlet opening for said steam, whereby only a slight decomposition of the polymer takes place due to the action of the steam.

2. A process for treating polyethylene terephthalate scrap which comprises: continuously passing said scrap in a solid state downwardly through a heated vessel while contacting the scrap with a countercurrent flow of superheated steam, the temperature of said steam being from about 200° C. to about 220° C. at the inlet point of said scrap and being from about 280° C. to about 450° C. at the inlet opening for said steam, melting said scrap by the action of said steam in the area adjacent said inlet opening for said steam, and thereafter drawing off said melt from said vessel while maintaining the collected melt in an area below the inlet point of said steam and while maintaining the temperature of said melt below about 280° C., whereby only a slight decomposition of the polymer takes place due to the action of the steam.

3. A process for treating polyethylene terephthalate scrap which comprises: continuously passing said scrap in a solid state downwardly through a heated vessel while contacting the scrap with a countercurrent flow of superheated steam, the relative viscosity of said scrap being from about $\eta_{rel}$ 1.55 to 1.65, said steam passing from an inlet opening through said vessel and out an exit opening, the temperature of said steam at its exit opening being below the softening point of said scrap and the temperature of said steam at its inlet opening being above the softening point of said scrap, whereby said scrap is melted in the area of said inlet opening, and withdrawing melt from said vessel at a rate such that the level of melt within said vessel remains below the inlet opening for said steam, the relative viscosity of said melt being from about $\eta_{rel}$ 1.2 to 1.4.

4. A process for treating polyethylene terephthalate scrap which comprises: continuously passing said scrap in a solid state downwardly through a heated vessel while contacting the scrap with a countercurrent flow of superheated steam, the relative viscosity of said scrap being from about $\eta_{rel}$ 1.55 to 1.65, the temperature of said steam being from about 200° C. to about 220° C. at the inlet point of said scrap and being from about 280° C. to about 450° C. at the inlet opening for said steam, melting said scrap by the action of said steam in the area adjacent said inlet opening for said steam, and thereafter drawing off said melt from said vessel while maintaining the collected melt in an area below the inlet point of said steam and while maintaining the temperature of said melt below about 280° C., the relative viscosity of said melt being from about $\eta_{rel}$ 1.2 to 1.4.

5. A process for treating polyethylene terephthalate scrap which comprises: continuously passing said scrap in a solid state downwardly through a heated vessel while contacting the scrap with a countercurrent flow of superheated steam, the temperature of said steam being from about 200° C. to about 220° C. at the inlet point of said scrap and being from about 280° C. to about 450° at the inlet opening for said steam, melting said scrap by the action of said steam in the area adjacent said inlet opening for said steam, drawing off said melt from said vessel while maintaining the collected melt in an area below the inlet point of said steam and while maintaining the temperature of said melt below about 280° C., whereby only a slight decomposition of the polymer takes place due to the action of the steam, and thereafter recondensing said melt and spinning the resultant polymer.

6. A process for treating polyethylene terephthalate scrap which comprises: continuously passing said scrap in a solid state downwardly through a heated vessel while contacting the scrap with a countercurrent flow of superheated steam, the temperature of said steam being from about 200° C. to about 220° C. at the inlet point of said scrap and being from about 280° C. to about 450° C. at the inlet opening for said steam, melting said scrap by the action of said steam in the area adjacent said inlet opening for said steam, drawing off said melt from said vessel while maintaining the collected melt in an area below the inlet point of said steam and while maintaining the temperature of said melt below about 280° C., whereby only a slight decomposition of the polymer takes place due to the action of the steam, adding to the melt from about 0.02% to about 0.06% based on the weight of the polymer of a material selected from the group consisting of 4-methyl-cyclohexanone and benzil, and thereafter recondensing said melt and spinning the resultant polymer.

7. A process as in claim 6 wherein the material added to the melted polymer is benzil.

8. A process as in claim 6 wherein the material added to the melted polymer is 4-methyl-cyclohexanone.

References Cited in the file of this patent

UNITED STATES PATENTS

| | | |
|---|---|---|
| 2,343,174 | Edison et al. | Feb. 29, 1944 |
| 2,762,788 | Siggel et al. | Sept. 11, 1956 |
| 2,856,383 | Knowles et al. | Oct. 14, 1958 |

FOREIGN PATENTS

| | | |
|---|---|---|
| 598,354 | Great Britain | Feb. 17, 1948 |